March 15, 1927.
A. S. BURKE
TOY VEHICLE
Filed Sept. 18, 1926
1,621,350
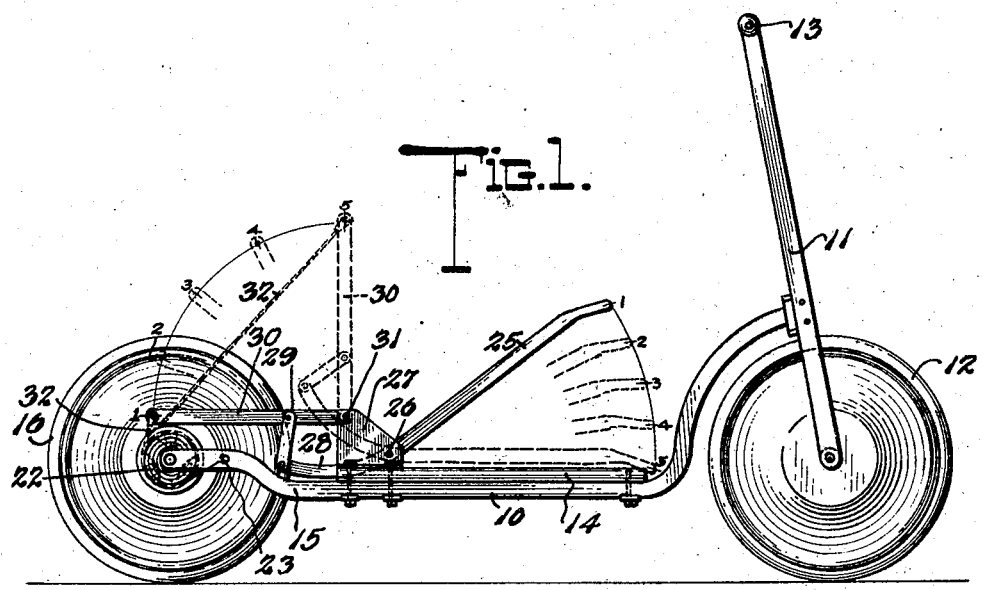
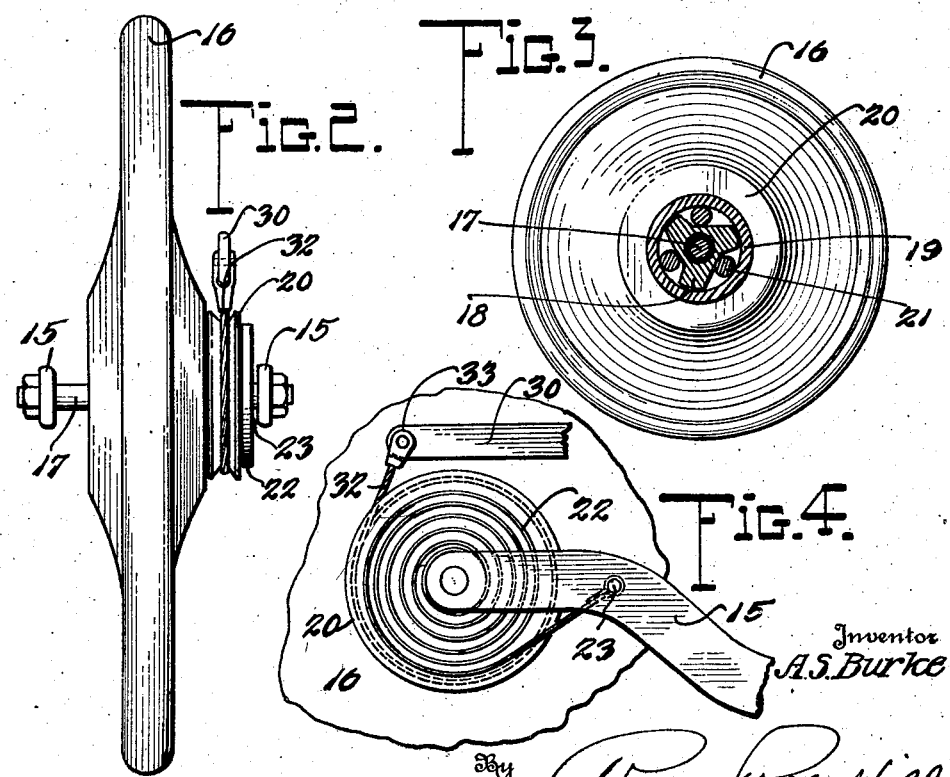
Inventor
A. S. Burke Patented Mar. 15, 1927.

1,621,350

UNITED STATES PATENT OFFICE.

ARTHUR S. BURKE, OF SIOUX FALLS, SOUTH DAKOTA.

TOY VEHICLE.

Application filed September 18, 1926. Serial No. 136,332.

This invention relates to a toy vehicle, and particularly to the construction of the leverage system used for propelling the same. In prior constructions of this character the power is directly applied from the foot pedal to the wheel actuating lever by a rigid connection, and generally the pedal and lever have a common fulcrum to which each is secured, so that the length of driving stroke of the lever must be identical with the length of the pedal stroke. In a device of this type the pedal stroke is necessarily limited in extent with the result that only a short propelling movement is imparted by the actuating lever to the wheel which requires a very rapid operation of the pedal to effect a desirable speed or propel the device forward a given distance.

For the reasons just stated the operation of the vehicle requires more strength than the average child is able to apply, particularly when ascending a grade or overcoming inertia in starting. If the pedal and lever be rigidly connected there is no difference in the intial power applied for starting nor any subsequent acceleration of the actuating lever during its travel.

I overcome these serious objections in the practical operation of the vehicle by providing a compound leverage through which a greater arc of travel is transmitted to the actuating lever than the length of stroke imparted to the pedal or power lever. This effects a much greater extent of forward propulsion upon each pedal stroke than can be secured by a direct rigid connection between the pedal and lever. Further, by the use of a movable or link connection between the power and actuating levers the leverage is changed during the driving stroke of the actuating lever so that the greatest leverage is initially applied to overcome inertia and this leverage gradually decreased during the travel of the actuating lever to effect an acceleration of its movement as it approaches the end of its propelling stroke. This result is secured by a change in position of the connecting member between the pedal and lever during the driving action and reduces the effort required for operation.

It has also been found particularly efficient to pivot the actuating lever separately from the power lever so that the length of the actuating lever may be changed to affect the relative extent of propulsion transmitted from the power lever through the link connection at the rear of the power lever.

The invention has for an object to provide a novel and improved construction in which the frame is provided with supporting wheels one of which is propelled, and a power lever mounted upon the frame and connected with an actuating lever controlling the propelled wheel so that a greater degree or extent of travel is secured at the actuating lever than that imparted to the power lever or pedal.

A further object of the invention is to provide a compound leverage propelling system involving a power lever and a separate actuating lever having a movable connection with the power lever by which the maximum power is applied to the actuating lever in the initial movement of the power lever for propelling purposes.

Another object of the invention is to provide a pivoted power lever having a movable link connection with an actuating lever, said levers being so proportioned and pivoted that the power transmitted from the power lever is gradually decreased and the speed of the actuating lever accelerated during its propelling travel.

Other and further objects and advantages of the invention will be hereinafter set forth and the novel features thereof defined by the appended claims.

In the accompanying drawing:—

Figure 1 is a side elevation showing the invention applied to a toy vehicle;

Figure 2 is an enlarged rear elevation of the propelling wheel;

Figure 3 is a detail vertical section showing the ratchet connection for the propelling wheel; and Figure 4 is a detail side elevation illustrating the restoring spring for said wheel.

Like reference characters designate corresponding parts throughout the several figures of the drawing.

The numeral 10 designates the frame of the vehicle which is of the well known "scooter" type and provided with a steering post 11 swiveled at its forward end and carrying a wheel 12 and the usual handle 13. This frame is provided with a platform 14 and is bifurcated at its rear portion 15 to embrace a propelling wheel 16. The portions 15 of the frame are connected by an axle member 17 upon which is mounted a spider 18 of a clutch device which may be of any desired construction and carried by the wheel. This member 18 is herein shown as surrounded by the hub 19 of a driving drum 20 and intermediate of the hub 19 and the spider arms a series of rollers or balls 21 is disposed to effect a wedging clutch in the movement of the drum to drive the wheel in one direction.

For the purpose of restoring the drum 20 after its clutched connection in the driving action a coil spring 22 is provided, one end thereof being secured to the hub 19 of the drum and the opposite end to the frame 15 as at 23.

For the purpose of propelling the vehicle a power lever 25 is provided and may be either hand or foot actuated but preferably comprises a pedal member disposed upon the frame in convenient position to be actuated by the right foot of the operator. This lever is pivoted at 26 upon a support 27 and the angularly disposed rear end 28 thereof pivotally connected with a link 29 pivoted intermediate the ends of the actuating or driving lever 30 which is fulcrumed upon the support 27 at 31. It will be noted that the pivots for the power and actuating levers are independent, which permits the use of actuating levers of different lengths to vary the distances of propulsion at a single stroke, and also facilitates the pivoted link connection which shifts in the relative travel of the levers so as to apply the maximum power at the beginning of the propelling stroke and decreasing this power with an accelerated speed during the remainder of the stroke until the driving lever is in the vertical position indicated by dotted lines in Figure 1. This driving lever is connected with the drum 20 by a flexible connection 32 of any desired type, such as a cable, which is wound upon the drum and secured at one end thereto while its opposite end is provided with a swivel connection 33 with the lever 30. It will be obvious that the drum will be formed upon its periphery to cooperate with the character of flexible connection wound thereon.

To further illustrate the change in leverage and the acceleration in movement occurring between the power and driving levers, a diagram is applied by dotted lines to Fig. 1 showing relative steps in the movement of these levers. For instance, between the points 1 and 2, which is initial or starting position of the levers, the maximum leverage is exerted and between the positions 2 and 3 the power lever travels the same distance as between positions 1 and 2 but the driving lever traverses a greater arc and the link position is so changed that there is a gradual decrease in leverage and increase in speed. This proceeds progressively between the positions 3 and 4 and 4 and 5, so that the greatest length of travel occurs in the latter position where the speed is accelerated and the leverage decreased to a minimum.

During the restoring of the parts there is no driving connection owing to the reverse action of the clutch so that the relation of the levers is not concerned except in the driving stroke.

It will be observed that the construction provided by this invention comprises a compound leverage in which the connection from the power lever shifts in its relation to the actuating lever and the latter is adapted for a length of stroke materially greater than that imparted to the power lever or pedal.

While the details of the invention have been herein shown and described, it is not confined thereto as changes and alterations may be made without departing from the spirit thereof as defined by the following claims.

Having thus described my invention, what I claim as new and desire to secure by Letters Patent is:—

1. In a toy vehicle, a frame provided with supporting wheels, one of which is propelled, a power lever, an actuating lever connected to the wheel to be propelled, and a connection between said levers by which a greater extent of travel is transmitted to the actuating lever than the extent of travel imparted to the power lever.

2. In a toy vehicle, a frame provided with supporting wheels, one of which is propelled, a power lever, an actuating lever connected to the wheel to be propelled, and a movable connection between said levers by which the maximum leverage is applied at the beginning of the power stroke and such leverage decreased with an acceleration of speed of the actuating lever during its progressive travel.

3. In a toy vehicle, a frame provided with supporting wheels, one of which is propelled, a power lever comprising a pedal member, an actuating lever disposed above the power lever and connected to the wheel to be propelled and adapted for a greater length of stroke than the power lever, and a link connection between said levers.

4. In a toy vehicle, a frame provided with supporting wheels one of which is propelled, a power lever, an actuating lever connected to the wheel to be propelled and adapted for a greater length of stroke than said power lever, and a movable connection between said levers.

5. In a toy vehicle, a frame provided with supporting wheels one of which is propelled, a power lever, an actuating lever connected to the wheel to be propelled adapted for a greater length of stroke than said power lever, and a link pivotally connected to the rear of the power lever and intermediate the ends of the actuating lever.

6. In a toy vehicle, a frame provided with supporting wheels, one of which is propelled, a platform on said frame, a support, a pedal lever pivoted intermediate its ends upon said support with its free end extended to the forward portion of the platform, a separately pivoted driving lever extended adjacent the axis of the propelled wheel and having a flexible connection to the wheel to be propelled, and a movable connection between said levers.

7. In a toy vehicle, a frame provided with supporting wheels, one of which is propelled, a platform on said frame, a support, a pedal lever pivoted intermediate its ends upon said support, a separately pivoted driving lever having a flexible connection to the wheel to be propelled, a movable connection between said levers, a drum upon which said flexible connection is wound, a one-way clutch between said drum and wheel, and a restoring spring extending from the drum to the vehicle frame.

8. In a toy vehicle, a frame provided with supporting wheels, one of which is propelled, a support upon said frame, a power lever pivoted upon said support intermediate its ends and having its rear portion angularly disposed, a driving lever pivoted upon the support above said power lever, a flexible connection from the driving lever to the wheel to be propelled, and a link pivoted to the rear end of the power lever and intermediate the ends of the driving lever.

9. A leverage system for a toy vehicle comprising a power lever pivotally mounted intermediate its ends, a driving lever pivoted above the power lever and at the rear of the pivot thereof, a link connecting the rear end of the power lever with the driving lever intermediate its ends, a one-way clutch disposed to actuate a propelling wheel, and a flexible connection from said clutch to said driving lever.

In testimony whereof I affix my signature.

ARTHUR S. BURKE.